United States Patent
Soria et al.

(10) Patent No.: US 6,573,208 B1
(45) Date of Patent: Jun. 3, 2003

(54) HOMOGENEOUS BULKY POROUS CERAMIC MATERIAL

(75) Inventors: Raymond Soria, Bazet (FR); Jean-Claude Foulon, Saint Lezer (FR); Jean-Michel Cayrey, Beaucens (FR)

(73) Assignee: Societe des Ceramiques Techniques (FR)

(*) Notice: Subject to any disclaimer, the term of this patent is extended or adjusted under 35 U.S.C. 154(b) by 0 days.

(21) Appl. No.: 09/272,156

(22) Filed: Mar. 19, 1999

(30) Foreign Application Priority Data

Mar. 20, 1998 (FR) .......................... 98 03 490

(51) Int. Cl.$^7$ .................. C04B 35/01; C04B 35/56; C04B 35/58
(52) U.S. Cl. ................ 501/95.1; 501/96.1; 501/97.1; 501/102; 501/133
(58) Field of Search ................ 501/80, 95.1, 96.1, 501/97.1, 102, 133

(56) References Cited

U.S. PATENT DOCUMENTS

| | | | | |
|---|---|---|---|---|
| 4,175,153 A | * | 11/1979 | Dobo et al. | 428/398 |
| 4,222,977 A | * | 9/1980 | Dobo | 264/63 |
| 4,778,499 A | * | 10/1988 | Beaver | 65/2 |
| H721 H | * | 1/1990 | McQuillan | 264/56 |
| 5,707,584 A | * | 1/1998 | Terpstra et al. | 264/628 |
| 5,766,760 A | * | 6/1998 | Tsai et al. | 428/376 |
| 5,922,299 A | * | 7/1999 | Bruinsma et al. | 423/335 |

FOREIGN PATENT DOCUMENTS

| | | |
|---|---|---|
| DE | 19609126 A | 3/1996 |
| DE | 19618920 A | 6/1996 |
| EP | 0657403 A1 | 6/1994 |
| EP | 0778250 A1 | 12/1996 |
| JP | 55119402 | * 9/1980 |
| JP | 56010533 | * 2/1981 |
| WO | WO94/23829 | 3/1994 |

OTHER PUBLICATIONS

"Hollow Fiber Extruded from Pure Oxides" Usatikov Sb Nauch Tr Ukr Nauch Issled Ins Ogneuporov No. 13 p 169–73, 1970.*

* cited by examiner

*Primary Examiner*—Paul Marcantoni
(74) *Attorney, Agent, or Firm*—Townsend and Townsend and Crew LLP

(57) ABSTRACT

A homogeneous bulky porous ceramic material is provided, the average pore diameter D50 of which is less than 4 μm and the closed porosity of which is less than 2 μm, and having a bubble point that matches the pore diameter measured on the material. A hollow fiber based on the material and a module employing such fibers together with a paste constituting a precursor for the material and including a pore-forming agent are also provided.

9 Claims, 1 Drawing Sheet

HOMOGENEOUS BULKY POROUS CERAMIC MATERIAL

BACKGROUND OF THE INVENTION

The present invention relates to a homogeneous bulky porous ceramic material, having adjustable and controlled porosity and pore diameter. The present ceramic porous body can be used for liquid filtration, gas separation, or for bringing fluids into contact as in catalytic reactions, or for emulsion production and other applications that use a ceramic porous material.

Numerous ceramic membranes are already known. They are generally formed by successively stacking layers on a support having large pores (macroporous support). The support gives the membrane its necessary mechanical strength. The stack of layers makes it possible to progressively reduce pore diameter. These layers are difficult to develop. The main characteristics of the filtration layer, in other words pore diameter and porosity (or porous volume), are also for a large part a function of the characteristics of the layer on which they are deposited, and this does not allow variation over a very extensive range. Additionally, their firing temperature needs to be below the firing temperature of the sub-layer. In some cases, this means a low firing temperature that is insufficient to allow optimal keying or bonding of the layer onto the sub-layer.

With this technique, filtration membrane manufacture is a long and costly procedure including a large number of steps; it does not make it possible to adapt membrane characteristics to the fluids to be filtered. On the other hand, porosity of the macroporous support is low to ensure sufficient mechanical strength when the membrane is in use. Finally, provision of a small-pore-diameter layer requires fairly low firing temperatures, such temperatures being insufficient to obtain the optimal properties for the material.

SUMMARY OF THE INVENTION

The present invention sets out to provide a homogeneous bulky porous ceramic material. More particularly the present invention sets out to provide a homogeneous bulky porous ceramic material having an average pore diameter D50 which preferalby is less than 4 µm and of which the closed porosity is less than 4%, preferaby less than 2%. D50 is the volume equivalent average diameter such that 50% of the pores have a diameter less than D50.

According to one embodiment, the distribution of pore diameter expressed in terms of volume is that of a monodisperse system; in this embodiment, standard deviation, expressed as a percentage, of volume equivalent average diameter D50 is less than 35%, preferably less than 25%. Typically, the material according to the invention will have a standard deviation, expressed as a percentage, comprised between 10 and 25% of the volume equivalent average diameter D50.

According to one embodiment, the material of the invention has a bubble point corresponding to the pore diameter measured on said material. According to this embodiment, there is correspondence when the two values differ by less than 10%.

A first advantage of the present invention is that it provides a homogeneous bulky structure, in other words one that has the same pore diameter throughout the material thickness. The term "bulky" has been chosen to distinguish this present material from a layer of small thickness; the characteristic dimension of the material is of the order of a millimeter, in other words the material is on a macroscopic scale. The term "homogeneous" is also designed to distinguish the material from a stack of successive layers which could possibly have a similar characteristic dimension.

A second advantage of the present invention is that of making it possible to adjust, in a simple fashion, the key characteristics of the membrane structure, in other words pore diameter and porosity, this being done in a simple and rapid manner, as well as over a wide range of variation without loss of mechanical strength. Such adaptability is obtained independently for pore diameter and porosity; in other words, both criteria can be adjusted independently one of the other. This adaptability is obtained without modifying the sintering temperature of the parts obtained.

A third advantage of the present invention is that of making it possible to obtain porous ceramic membranes that does not exhibit any structural defect.

A fourth advantage of the present invention is that it simplifies manufacture, due to eliminating, firstly, intermediate layer manufacture and, secondly, the need for end sealing.

DESCRIPTION OF THE SPECIFIC EMBODIMENTS

Figure 1:
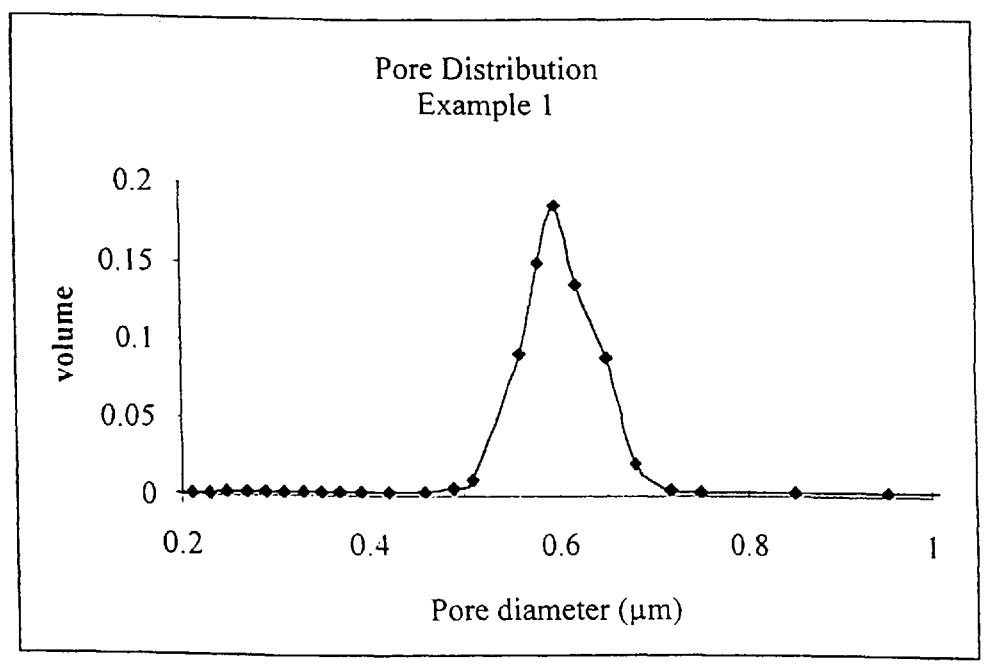
FIG. 1 is a distribution curve showing pore diameter of one embodiment of a homogeneous bulky porous ceramic material.
Figure 2:
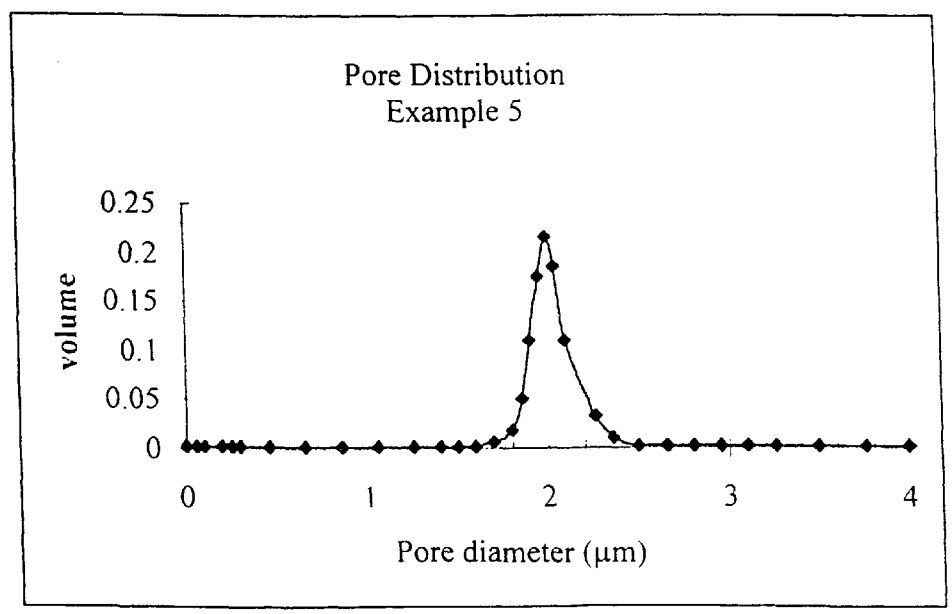
FIG. 2 is a distribution curve showing pore diameter of another embodiment of a homogeneous bulky porous ceramic material.

Below, we shall consider the pore diameter distribution curve to be a Gaussian curve, the standard deviation then being the width at half the height of the peak in the curve. FIGS. 1 and 2 show pore diameter distribution curves expressed in terms of volume of the materials of examples 1 and 5, respectively.

The present invention provides a porous body having a homogeneous structure. The structure is characterized by a pore diameter and a porosity, i.e. a porous volume. These values are measured by mercury porosimetry. Pore diameter D50 of the material is, for example, preferably below 2 µm, and in general is comprised between 50 nm and 1.5 µm. This diameter variation is controlled by the initial composition of the paste for extrusion. The range over which variation is possible is very wide.

The porous volume, or porosity, of the material according to the invention is such that the closed porosity is below 4%, preferably below 2%, advantageously below 1%. The open porous volume, or open porosity, is generally comprised between 10 and 70%; and the invention notably makes it possible to obtain very high values for open porosity, over 30%, for example between 40%, even 45%, and 60%. Variation in open porosity is controlled by the initial composition of the paste for extrusion.

One can thus obtain porous materials having an average pore diameter comprised between 0.5 and 2 µm with an open porosity comprised between 45 and 60%.

The present invention makes it possible to obtain membranes that do not exhibit any defect. This characteristic is measured by a the bubble point technique (see the Article by T. H. Metzler et al, Bulletin of the Parenteral Drug Association, volume 65 (4), 1971, pp 165 to 174). This technique makes it possible to determine the pressure needed to make a bubble of gas pass through the membrane previously saturated with a wetting liquid. A mathematical relation (Jurin's law) links gas pressure, surface tension of the wetting liquid and the pore diameter for passage. The present invention makes it possible to obtain a bubble point (diameter of pore allowing passage) which corresponds to a pore diameter measured on the membranes (to 10%).

The invention also provides a hollow fiber based on the material according to the invention together with a filtration and/or reaction module comprising such fibers.

The invention also covers a method for making a porous ceramic membrane having the advantages listed above, as well as the precursor paste for said material.

The present invention thus also provides a method for preparing a homogeneous bulky porous ceramic material, notably a material according to the invention, comprising the following main steps:

(i) preparing a organic paste comprising an organic portion or filler, an organic binder, a pore-forming agent and a solvent with, optionally, a deflocculating agent and/or an inorganic binder and/or a processability-enhancing agent;

(ii) shaping said paste; and (iii) consolidating this shape by sintering.

The precursor paste for the material comprises a mix of an inorganic compound or filler, an organic binder, a pore-forming agent, a solvent, and, optionally, an inorganic binder and/or a deflocculating agent which is adapted to this metallic compound and/or a processability-enhancing agent (in general, an extrusion agent).

The inorganic portion of said paste is constituted by inorganic particles, preferably by particles of a metal compound which, after sintering, will form the homogeneous porous matrix. The metallic compound is either a non-oxide compound, or a metal oxide. In the case of a non-oxide derivative, a derivative of silicon or aluminium will be chosen and, preferably, silicon carbide, silicon nitride or aluminium nitride. Where the metal compound is an oxide, this will be chosen from aluminium, silicon or group IVA (titanium group) or VA (vanadium group) metals oxides and, preferably, alumina, zirconium oxide or titanium oxide. These oxides can be used alone or in a mixture. The metal compound has, for example, an average particle diameter (measured by sedigraphy) between the 0.15 and 2 $\mu$m and, preferably, between 0.15 and 0.6 $\mu$m. Its content in the paste will be comprised between 50 and 85% by weight and, preferably, between 65 and 80% by weight. The inorganic filler is preferably constituted of particles the diameters d90 and d50 are such that d90/d50<3 and advantageously d90/d50<2.

The organic binder gives the paste its necessary theological properties needed for extrusion and its mechanical properties needed to obtain good cohesion of the product after extrusion. Said organic binder is preferably, but not obligatorily, a water-soluble polymer. The polymer will for example have, for a 2% by weight solution, a viscosity measured at 20° C. comprised between 4 and 10 Pa/s. This polymer can be selected from the celluloses and their derivatives, notably hydroxyethyl cellulose and/or microcrystalline cellulose, but can also be a polyacrylic acid or a polyvinyl alcohol, etc. The paste will for example contain between 2 and 10% by weight of organic binder and preferably between 3 and 8% by weight.

The role of the solvent is to disperse the inorganic portion and the binder. Where a water-soluble polymer is employed, water will be selected as the solvent; where the polymer is not water-soluble, an alcohol, for example ethanol, will be chosen as solvent. The concentration of the solvent will be comprised between, for example, 8 and 40% by weight and, preferably, between 10 and 27% by weight.

The porosity- or pore-forming agent is characterized by a low decomposition temperature, for example below 450° C., preferably below 250° C. It is characterized, firstly, by the average size of the particles composing it, this size being adapted to the size of the particles of the metallic filler. This size is for example comprised between 5 and 30 $\mu$m and preferably, between 8 and 16 $\mu$m. The pore-forming agent is substantially insoluble in the solvent selected. A pore-forming agent of natural origin can be used and, for example, can be sawdust from nutshells, flour or carbon black, or can be of artificial origin and, for example, be low density polyethylene balls, or a water/oil emulsion and, for example, be Mobilcer (an oil-in-water emulsion).

Inorganic filler particle size and pore-forming agent particle size can vary independently of each over a very wide range.

These compounds are mixed to form a paste with an extrudability comprised in general between 9 and 13 bar, and preferably between 10 and 16 bars.

A deflocculating agent that is soluble in the solvent will improve dispersion of the particles of the metallic compound. One will for example chose a polyacrylic acid, a phospho-organic acid or an alkyl-sulfonic acid. Deflocculating agent content is of the order of 0.5 to 1% by weight.

In some cases, an agent for improving processability can be added, and generally an extrusion-enhancing agent such as polyethylene glycol. Extrusion-enhancing agent content is of the order of 0.5 to 1% by weight.

Bending strength can be modified conventionally by introducing inorganic binders into the composition of the paste which will react during firing to increase cohesion forces between the particles.

The invention finally provides the precursor paste such as described above, in other words a paste comprising, dispersed in a solvent, an inorganic portion or filler, an organic binder and a pore-forming agent.

The paste is shaped, for example, and preferably, by extrusion, in a conventional fashion. The product is then dried and sintered at a high temperature, for example comprised between 1,400° C. and 1,750° C.

The following examples illustrate the invention without limiting it.

In the examples, we measure the bubble point of the ceramic materials of the examples, which reveals the largest pore present in the fiber. Measurement, using absolute ethanol (surface tension of 24. 10–3 Nm) as impregnation medium gives a bubble pressure which is a pressure starting from which formation of a bubble able to pass through is observed. By applying Jurin's law, one then obtains the diameter of the largest pore as a function of the measured pressure.

EXAMPLE 1

A ceramic paste was produced by mixing an alumina of average size of 0.6 $\mu$m, a microcrystalline cellulose as organic binder, water as the solvent and a pore-forming agent consisting of low density polyethylene particles, the average size of these particles being 15 $\mu$m. The ratio d90/d50 of the powder used was 1.4. The composition of the paste (in percentage by weight) was the following:

| | |
|---|---|
| alumina | 75 |
| microcrystalline cellulose | 2 |
| water | 8 |
| low density polyethylene | 15. |

The paste thus obtained had an extrudability of 10. This paste was extruded through a die for hollow fibers so as to form a 1.5 mm outside diameter and 0.8 mm inside diameter tube. The fiber thus obtained was fired at 1,450° C. in a normal atmosphere. The decomposition temperature of the low density polyethylene selected was 230° C., it was thus completely destroyed during firing of the fiber.

The fiber was characterized by mercury porosimetry. Mercury penetration only showed a single peak centered on 0.6 µm, indicating a mono-disperse distribution of the pores. Half-height width of the peak in the curve was 0.08 µm, this width corresponding to the standard deviation of pore distribution which, in the present case was, expressed in percentage, 13%. The curve showing volume distribution of pore diameter is shown in FIG. 1.

Further, its porous volume was 60%. The fiber had a density of 3.9. The absolute density of the alumina was 3.94. Closed porosity, not available for filtration, was a maximum of 1%.

Measurement of bubble point gave a pressure of 1,600 mbar, equivalent to a pore diameter of 0.6 µm, which matches pore diameter determined by mercury porosimetry. The fiber was consequently exempt of defects.

EXAMPLE 2

A ceramic paste was produced by mixing a silica of average size 0.2 µm, a polyvinyl alcohol as organic binder, water as the solvent and a pore-forming agent consisting of particles of a vinyl acetate-ethylene copolymer, the average size of these particles being 30 µm. The ratio d90/d50 of the silica employed was 1.5. The composition of this paste was (in percentage by weight):

| | |
|---|---|
| silica | 50 |
| polyvinyl alcohol | 2 |
| water | 40 |
| vinyl acetate-ethylene copolymer | 8. |

The paste thus obtained had an extrudability of 9. This paste was used for forming a 5 cm side porous block. The block was fired at 1530° C. in a normal atmosphere. The decomposition temperature of the vinyl acetate-ethylene copolymer selected was 180° C., it was thus completely destroyed during sintering of the porous block.

The block was characterized by mercury porosimetry. Mercury penetration only showed a single peak centered on 0.4 µm, indicating a mono-disperse distribution of the pores. Half-height width of the peak in the curve was 0.1 µm, this width corresponding to the standard deviation of pore distribution which, in the present case was, expressed in percentage, 25%.

Further, its porous volume was 10%. The block had a density of 2.3. The absolute density of the silica was 2.32. Closed porosity, not available for filtration, was a maximum of 0.9%.

Measurement of bubble point gave a pressure of 2,400 mbar, equivalent to a pore diameter of 0.4 µm, which matches pore diameter determined by mercury porosimetry. The block was consequently exempt of defects.

EXAMPLE 3

A ceramic paste was produced by mixing a powder of titanium oxide of average size 2 µm, a hydroxy propyl cellulose (HPC) as organic binder, water as the solvent, a pore-forming agent constituted by particles of active carbon of average size 8 µm, and a polymethacrylic acid as deflocculating agent. The d90/d50 ratio of the titanium oxide powder used was 1.7. The composition of this paste (in percentage by weight) was the following:

| | |
|---|---|
| titanium oxide | 65 |
| HPC | 3 |
| water | 24 |
| active carbon | 7 |
| polymethacrylic acid | 1. |

The paste thus obtained had an extrudability of 19. This paste was used for forming a 1 mm outside diameter and 0.5 mm inside diameter porous fiber. The fiber was fired at 1400° C. in an argon atmosphere. The decomposition temperature of the active carbon was 420° C., it was thus completely destroyed during sintering of the porous fiber.

The fiber was characterized by mercury porosimetry. Mercury penetration only showed a single peak centered on 1.2 µm, indicating a mono-disperse distribution of the pores. Half-height width of the peak in the curve was 0.1 µm, this width corresponding to the standard deviation of pore distribution which, in the present case was, expressed in percentage, 8%.

Further, its porous volume was 55%. The fiber had a density of 3.76. The absolute density of the titanium oxide was 3.8. Closed porosity, not available for filtration, was a maximum of 1%.

Measurement of bubble point gave a pressure of 800 mbar, equivalent to a pore diameter of 1.2 µm, which matches pore diameter determined by mercury porosimetry. The fiber was consequently exempt of defects.

EXAMPLE 4

A ceramic paste was produced by mixing a powder of zirconium oxide of average size 0.25 µm, a microcrystalline cellulose as organic binder, water as the solvent, and a pore-forming agent constituted by active nut shell dust of average size 10 µm. The d90/d50 ratio of the zirconium used was 1.2. This paste had the following composition (in percentage by weight):

| | |
|---|---|
| zirconium oxide | 85 |
| microcrystalline cellulose | 2 |
| water | 8 |
| nut shell dust | 5. |

The paste thus obtained had an extrudability of 30. This paste was used for forming a 1 mm outside diameter and 0.3 mm inside diameter porous fiber. The fiber was fired at 1700° C. in a normal atmosphere. The decomposition temperature of the dust was 350° C., it was thus completely destroyed during sintering of the porous fiber.

The fiber was characterized by mercury porosimetry. Mercury penetration only showed a single peak centered on 0.05 μm, indicating a mono-disperse distribution of the pores. Half-height width of the peak in the curve was 0.01 μm, this width corresponding to the standard deviation of pore distribution which, in the present case was, expressed in percentage, 20%.

Further, its porous volume was 28%. The fiber had a density of 5.56. The absolute density of the zirconia was 5.6. Closed porosity, not available for filtration, was a maximum of 0.4%.

Measurement of bubble point gave a pressure of 19200 mbar, equivalent to a pore diameter of 0.05 μm, which matches pore diameter determined by mercury porosimetry. The fiber was consequently exempt of defects.

EXAMPLE 5

A ceramic paste was produced by mixing a powder of vanadium oxide of average size 2 μm, a polyacrylic acid (PAA) as organic binder, water as the solvent, polyethylene glycol as the extrusion agent and a pore-forming agent constituted by an emulsion of fats in water, the average size of the fat globules being 26 μm. The d90/d50 ratio of the vanadium oxide powder employed was 1.8. This paste had the following composition (in percentage by weight):

| | |
|---|---|
| vanadium oxide | 62 |
| PAA | 8 |
| water | 10 |
| emulsion | 19 |
| polyethylene glycol | 1. |

The paste thus obtained had an extrudability of 13. This paste was used for forming a porous block of side 12 cm. The block was fired at 1600° C. in a normal atmosphere. The decomposition temperature of the emulsion chosen was 160° C., it was thus completely destroyed during sintering of the porous fiber.

The fiber was characterized by mercury porosimetry. Mercury penetration only showed a single peak centered on 2 μm, indicating a mono-disperse distribution of the pores. Half-height width of the peak in the curve was 0.2 μm, this width corresponding to the standard deviation of pore distribution which, in the present case was, expressed in percentage, 10%. Volume distribution of pore diameter is shown in FIG. 2.

Further, its porous volume was 47%. The block had a density of 4.86. The absolute density of the vanadium oxide was 4.87. Closed porosity, not available for filtration, was zero.

Measurement of bubble point gave a pressure of 480 mbar, equivalent to a pore diameter of 2 μm, which matches pore diameter determined by mercury porosimetry. The block was consequently exempt of defects.

EXAMPLE 6

A ceramic paste was produced by mixing a powder of silicon nitride of average size of 0.6 μm, an ethyl cellulose as organic binder, ethanol as the solvent, a pore-forming agent constituted by particles of low-density polyethylene (LDPE) the average size of which was 5 μm. The d90/d50 ratio of the silicon nitride powder employed was 1.5. This paste had the following composition (in percentage by weight):

| | |
|---|---|
| silicon nitride | 80 |
| ethyl cellulose | 3 |
| ethanol | 10 |
| LDPE | 7. |

The paste thus obtained had an extrudability of 12. This paste was used for forming a 1 mm outside diameter and 0.5 mm inside diameter porous fiber. The fiber was fired at 1750° C. in an argon atmosphere. The decomposition temperature of the active carbon was 210° C., it was thus completely destroyed during sintering of the porous fiber.

The fiber was characterized by mercury porosimetry. Mercury penetration only showed a single peak centered on 0.5 μm, indicating a mono-disperse distribution of the pores. Half-height width of the peak in the curve was 0.12 μm, this width corresponding to the standard deviation of pore distribution which, in the present case was, expressed in percentage, 24%.

Further, its porous volume was 35%. The fiber had a density of 3.15%. The absolute density of the silicon nitride was 3.18. Closed porosity, not available for filtration, was a maximum of 0.9%.

Measurement of bubble point gave a pressure of 1920 mbar, equivalent to a pore diameter of 0.5 μm, which matches pore diameter determined by mercury porosimetry. The fiber was consequently exempt of defects.

EXAMPLE 7

A ceramic paste was produced by mixing an alumina of average size 0.9 μm, a powder of titanium oxide of average size 1.3 μm, a microcrystalline cellulose as organic binder, water as the solvent and a pore-forming agent constituted by particles of an ethylene vinyl acetate copolymer, the average size of the particles being 12 μm. The d90/d50 ratio of the mixture of oxide powers employed was 1.8. This paste had the following composition (in percentages by weight):

| | |
|---|---|
| alumina | 50 |
| titanium oxide | 20 |
| microcrystalline cellulose | 10 |
| water | 8 |
| ethylene-vinyl acetate copolymer | 12 |

The paste thus obtained had an extrudability of 9. This paste was used for forming a porous block of 5 cm side. The block was fired at 1500° C. in a normal atmosphere. The decomposition temperature of the emulsion chosen was 150° C., it was thus completely destroyed during firing of the porous block.

The block was characterized by mercury porosimetry. Mercury penetration only showed a single peak centered on 0.9 μm, indicating a mono-disperse distribution of the pores. Half-height width of the peak in the curve was 0.1 μm, this width corresponding to the standard deviation of pore distribution which, in the present case was, expressed in percentage, 11%.

Further, its porous volume was 59%. The block had a density of 3.85%. The absolute density of the alumina-titanium oxide mixture was 3.87. Closed porosity, not available for filtration, was a maximum of 0.5%.

Measurement of bubble point gave a pressure of 1065 mbar, equivalent to a pore diameter of 0.9 μm, which matches pore diameter determined by mercury porosimetry. The block was consequently exempt of defects.

EXAMPLE 8

A ceramic paste was produced by mixing an alumina of average size 1.8 µm, a hydroxy ethyl cellulose (HEC) as organic binder, water as the solvent and a pore-forming agent constituted by nut shell dust, the average size of these particles being 20 µm. The d90/d50 ratio of the alumina powder employed was 2. The composition of this paste (in percentage by weight) was the following:

| | |
|---|---|
| alumina | 63 |
| HEC | 5 |
| water | 11 |
| nut shell dust | 19. |

The paste thus obtained had an extrudability of 14. This paste was used for forming a 15 cm-long porous plate of 5 cm side. The plate was fired at 1500° C. in a normal atmosphere. The decomposition temperature of the dust was 450° C., it was thus completely destroyed during firing of the porous plate.

The plate was characterized by mercury porosimetry. Mercury penetration only showed a single peak centered on 1.5 µm, indicating a mono-disperse distribution of the pores. Half-height width of the peak in the curve was 0.3 µm, this width corresponding to the standard deviation of pore distribution which, in the present case was, expressed in percentage, 20%.

Further, its porous volume was 52%. The plate had a density of 3.92%. The absolute density of the alumina was 3.94. Closed porosity, not available for filtration, was a maximum of 0.5%.

Measurement of bubble point gave a pressure of 640 mbar, equivalent to a pore diameter of 1.5 µm, which matches pore diameter determined by mercury porosimetry. The plate was consequently exempt of defects.

The invention is not limited to the embodiments that have been described but may be subject to numerous variations readily accessible to those skilled in the art.

What is claimed is:

1. A hollow fiber derived from a homogeneous bulky porous ceramic material the average pore diameter D50 of which is less than 4 µm and of which closed porosity is less than 4% and open porosity is between 10 to 70 vol. %, where the hollow fiber has an inner diameter of 0.3 mm to 0.8 mm.

2. The hollow fiber of claim 1, wherein the bubble point corresponds to the pore diameter measured on said bulkyl porous ceramic material, and in which the pore diameter is less than 2 µm.

3. The hollow fiber of claim 2, wherein the average pore diameter is comprised between 0.5 and 2 µm and the open porosity is comprised between 45 and 60%.

4. The hollow fiber of claim 3, wherein said homogeneous bulky porous ceramic material comprises a metallic oxide ceramic material.

5. A hollow fiber derived from a homogeneous bulky porous ceramic material the average pore diameter D50 of which is less than 4 µm and of which closed porosity is less than 4% and open porosity is between 10 to 70 vol. %, in which the bubble point corresponds to the pore diameter measured on said ceramic material, where the hollow fiber has an inner diameter of 0.3 mm to 0.8 mm.

6. The hollow fiber of claim 5, wherein the open porosity of said ceramic material comprises between 45 and 60%.

7. The hollow fiber of claim 6, wherein the pore diameter of said ceramic material is less than 2 µm.

8. The hollow fiber of claim 6, wherein the pore diameter of said ceramic material is between 0.5 and 2 µm.

9. A hollow fiber derived from a homogeneous bulky porous ceramic material the average pore diameter D50 of which is less than 4 µm and of which closed porosity is less than 4%, in which the bubble point corresponds to the pore diameter measured on said material, and in which the average pore diameter is comprised between 0.5 and 2 µm and the open porosity is comprised between 45 and 60%, where the characteristic dimension of said material is of the order of a millimeter.

* * * * *

UNITED STATES PATENT AND TRADEMARK OFFICE
CERTIFICATE OF CORRECTION

PATENT NO. : 6,573,208 B1
DATED : June 3, 2003
INVENTOR(S) : Raymond Soria, Jean-Claude Foulon and Jean-Michel Cayrey It is certified that error appears in the above-identified patent and that said Letters Patent is hereby corrected as shown below:

Column 10,
Line 17, please delete the word "ceramic".

Signed and Sealed this

Twenty-ninth Day of June, 2004

JON W. DUDAS
*Acting Director of the United States Patent and Trademark Office*